(12) United States Patent
Liu

(10) Patent No.: US 9,919,414 B1
(45) Date of Patent: Mar. 20, 2018

(54) TOOL CABINET

(71) Applicant: Chia-Ming Liu, Douliou (TW)

(72) Inventor: Chia-Ming Liu, Douliou (TW)

( * ) Notice: Subject to any disclaimer, the term of this patent is extended or adjusted under 35 U.S.C. 154(b) by 0 days.

(21) Appl. No.: 15/658,604

(22) Filed: Jul. 25, 2017

Related U.S. Application Data

(63) Continuation-in-part of application No. 15/353,001, filed on Nov. 16, 2016.

(30) Foreign Application Priority Data

Aug. 31, 2016 (CN) .................... 2016 2 1015361 U
Apr. 24, 2017 (CN) .................... 2017 2 0432707 U

(51) Int. Cl.
  B25H 1/12    (2006.01)
  B25H 1/10    (2006.01)
  B25H 3/00    (2006.01)

(52) U.S. Cl.
  CPC ............... B25H 1/10 (2013.01); B25H 1/12 (2013.01); B25H 3/00 (2013.01)

(58) Field of Classification Search
  CPC ........... A47B 9/04; A47B 13/00; A47B 37/00; A47B 45/00; A47B 46/00; A47B 83/00; A47B 96/00; B25H 1/10; B25H 1/12; B25H 1/16; B25H 3/00
  USPC ...... 312/196, 223.3, 306, 312, 317.3, 319.5, 312/902; 108/59, 106, 147.19
  See application file for complete search history.

(56) References Cited

U.S. PATENT DOCUMENTS

| | | | | |
|---|---|---|---|---|
| 654,922 A * | 7/1900 | Schipkowsky | ...... | A47B 17/036 312/196 |
| 742,118 A * | 10/1903 | Huddleston | ............ | A47B 31/00 108/17 |
| 1,099,521 A * | 6/1914 | Sprung | ............... | E05B 65/0003 312/196 |
| 1,247,590 A * | 11/1917 | Sprung | .................. | A47B 51/00 312/196 |
| 1,459,930 A * | 6/1923 | Riehle | ...................... | B25H 1/04 144/285 |
| 2,019,455 A * | 10/1935 | Lehman | .................. | A47B 17/02 312/196 |
| 2,931,685 A * | 4/1960 | Myra | ...................... | A47B 17/02 108/32 |
| 3,245,741 A * | 4/1966 | Bartlett | .................. | A47B 17/02 312/196 |
| 3,297,387 A * | 1/1967 | Parsons | .................. | A47B 29/00 112/217.1 |
| 4,740,044 A * | 4/1988 | Taylor | .................... | A47B 21/03 312/196 |

(Continued)

*Primary Examiner* — James O Hansen
(74) *Attorney, Agent, or Firm* — Trop Pruner & Hu, P.C.

(57) ABSTRACT

A tool cabinet includes a cabinet body having two guide rails, a movable storage unit having two extension members that are coupled respectively to the guide rails, two lifting units, and two driving units. Each lifting units has a guide tube mounted to one of the cabinet body and the storage unit, a threaded member non-rotatably connected to the guide tube, and a threaded rod mounted to the other one of the cabinet body and the storage unit and connected threadedly to the threaded member, such that rotation of the threaded rods drives the movement of the storage unit between lowered and lifted positions. The driving units are configured to synchronously drive the rotations of the threaded rods of the lifting units.

5 Claims, 11 Drawing Sheets

(56) References Cited

U.S. PATENT DOCUMENTS

| | | | | |
|---|---|---|---|---|
| 5,129,611 | A * | 7/1992 | Grover | F16M 11/42 108/147 |
| 6,213,575 | B1 * | 4/2001 | Brin, Jr. | A47B 77/04 108/147 |
| 6,312,069 | B1 * | 11/2001 | Weng | A47B 9/06 108/147 |
| 6,634,668 | B2 * | 10/2003 | Urffer, III | A47F 5/108 280/47.35 |
| 8,033,620 | B2 * | 10/2011 | Retchloff | B25H 3/00 312/290 |
| 2002/0101139 | A1 * | 8/2002 | Lee | A47B 21/0073 312/196 |
| 2003/0106614 | A1 * | 6/2003 | Noden | B25H 1/16 144/286.1 |
| 2005/0046315 | A1 * | 3/2005 | Doane | A47B 17/02 312/196 |
| 2012/0025681 | A1 * | 2/2012 | Ton | A47B 46/00 312/309 |
| 2013/0088131 | A1 * | 4/2013 | Messing | A47B 51/00 312/247 |
| 2014/0217861 | A1 * | 8/2014 | Cole | A47B 45/00 312/205 |

\* cited by examiner

TOOL CABINET

CROSS-REFERENCE TO RELATED APPLICATION

This application is a continuation-in-part of co-pending U.S. patent application Ser. No. 15/353,001, filed by the applicant on Nov. 16, 2016, which claims priority of Chinese Patent Application No. 201621015361.4, filed on Aug. 31, 2016. This application also claims priority of Chinese Patent Application No. 201720432707.9, filed on Apr. 24, 2017.

FIELD

The disclosure relates to a tool cabinet, more particularly to a tool cabinet that has a height-adjustable storage unit.

BACKGROUND

A conventional tool cabinet assembly includes a working platform and a storage rack. Generally, the storage rack is hung fixedly on a wall and above the working platform, and provides space for storing objects.

However, since the storage rack has to be hung at a relatively high position from the working platform in order to preserve sufficient working space for a user, access to the objects stored in the storage rack may be difficult to the user.

SUMMARY

Therefore, an object of the disclosure is to provide a tool cabinet that can alleviate the drawback of the prior art.

According to the disclosure, the tool cabinet includes a cabinet body, a working platform, a storage unit, two lifting units, two driving units, and a control unit. The cabinet body includes two spaced-apart upright guide rails. The working platform is disposed on a top end of the cabinet body. The storage unit includes a support member and two hollow extension members. The support member is disposed above the working platform. The extension members are respectively disposed on opposite ends of the support member, and are coupled respectively and telescopically to the guide rails, such that the storage unit is movable relative to the cabinet body between a lowered position, where the support member is proximate to the working platform, and a lifted position, where the support member is distal from the working platform. Each of the lifting units includes a guide tube, a threaded member and a threaded rod. The guide tube is mounted to one of the cabinet body and the storage unit. The threaded member is non-rotatably connected to the guide tube. The threaded rod is mounted rotatably to the other one of the cabinet body and the storage unit, and is connected threadedly to the threaded member, such that rotation of the threaded rods of the lifting units drives the movement of the storage unit between the lowered and lifted positions. The driving units are disposed on the other one of the cabinet body and the storage unit. Each of the driving units includes a motor, a speed reduction mechanism that is connected between the motor and the threaded rod of a respective one of the lifting units, and that is driven by the motor to rotate the threaded rod of the respective one of the lifting units. The control unit is electrically connected to the motors of the driving units for driving the motors to operate synchronously.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
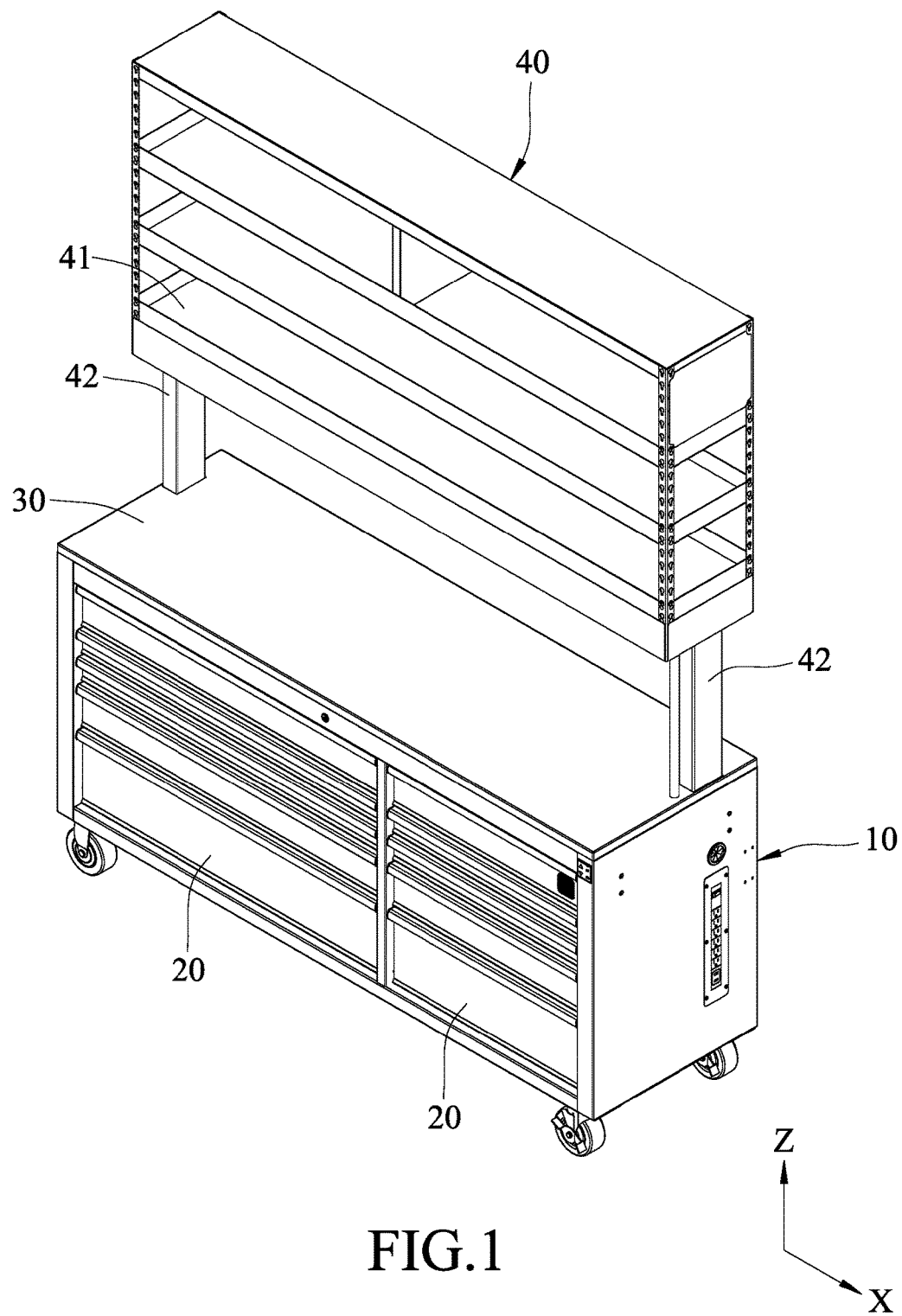
FIG. 1 is a perspective view of a first embodiment of a tool cabinet according to the disclosure, illustrating a storage unit at a lifted position.

Before the present invention is described in greater detail, it should be noted that where considered appropriate, reference numerals or terminal portions of reference numerals have been repeated among the figures to indicate corresponding or analogous elements, which may optionally have similar characteristics.

Figure 2:
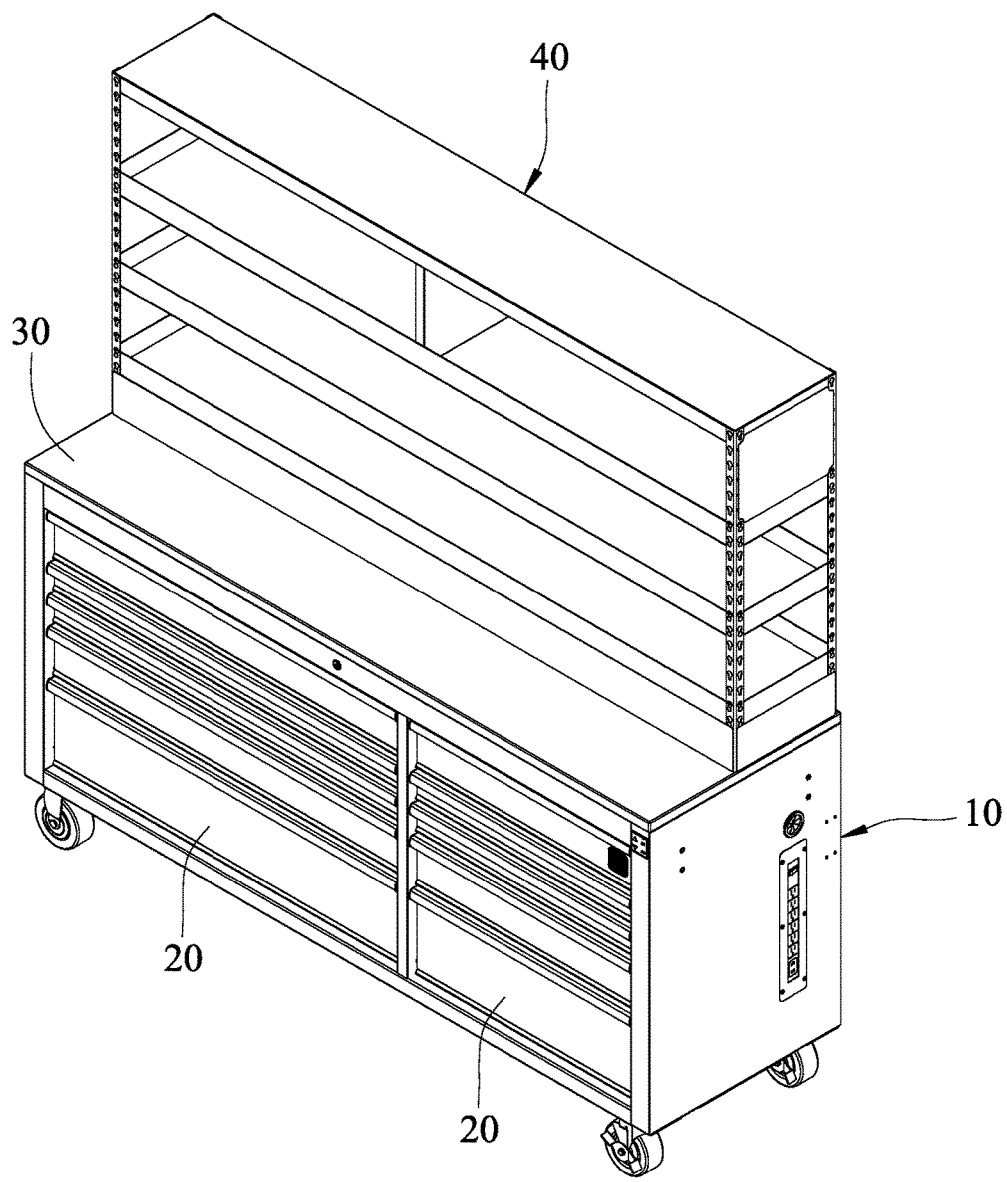
FIG. 2 is a view similar to FIG. 1, but illustrating the storage unit at a lowered position.
Figure 3:
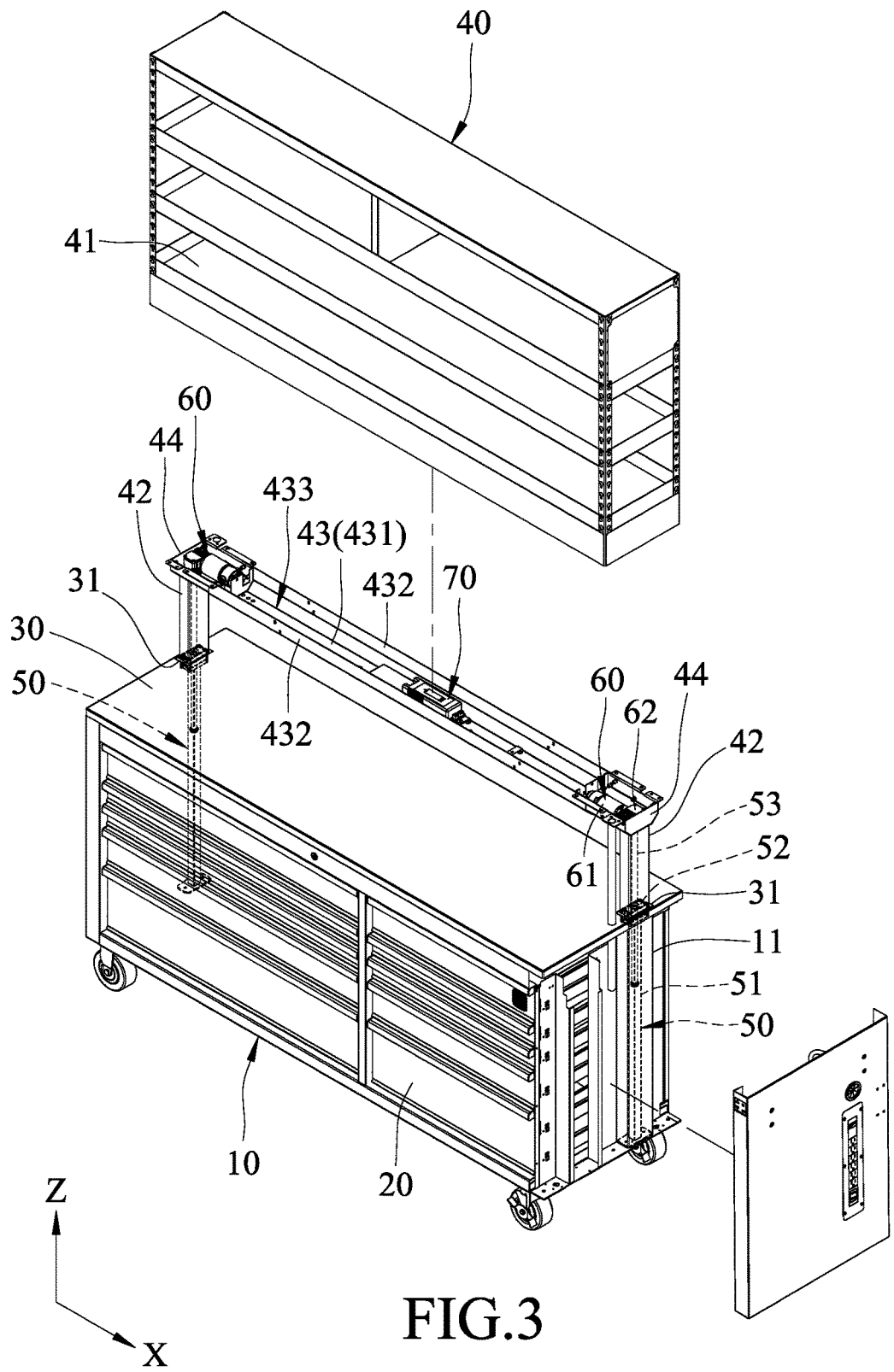
FIG. 3 is a partly exploded perspective view of the first embodiment.

Referring to FIGS. 1 to 3, a first embodiment of a tool cabinet according to the disclosure includes a cabinet body 10, a plurality of drawers 20, a working platform 30, a storage unit 40, two lifting units 50, two driving units 60, and a control unit 70.

Figure 4:
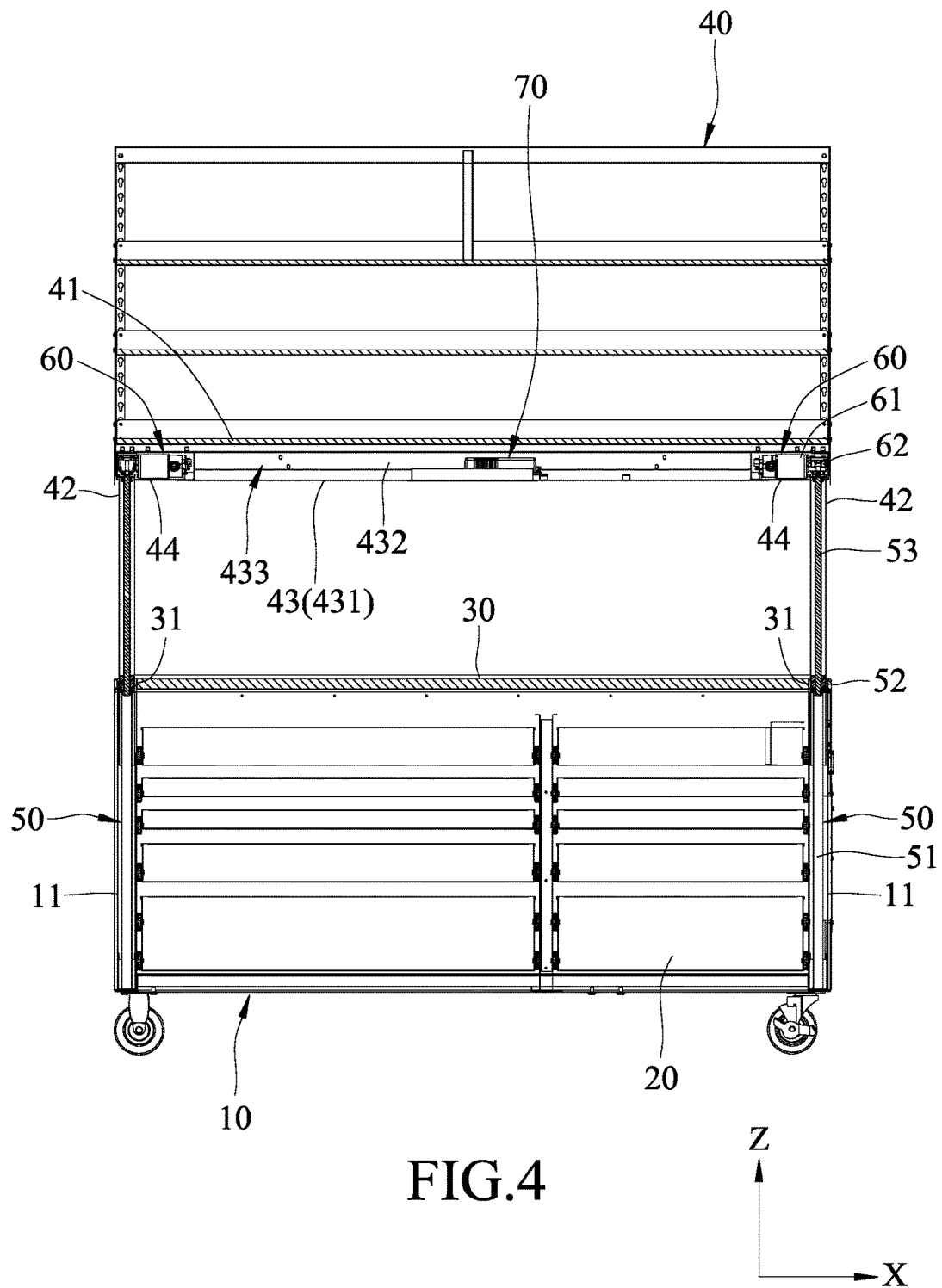
FIG. 4 is a sectional view of the first embodiment, illustrating the storage unit at the lifted position.
Figure 5:
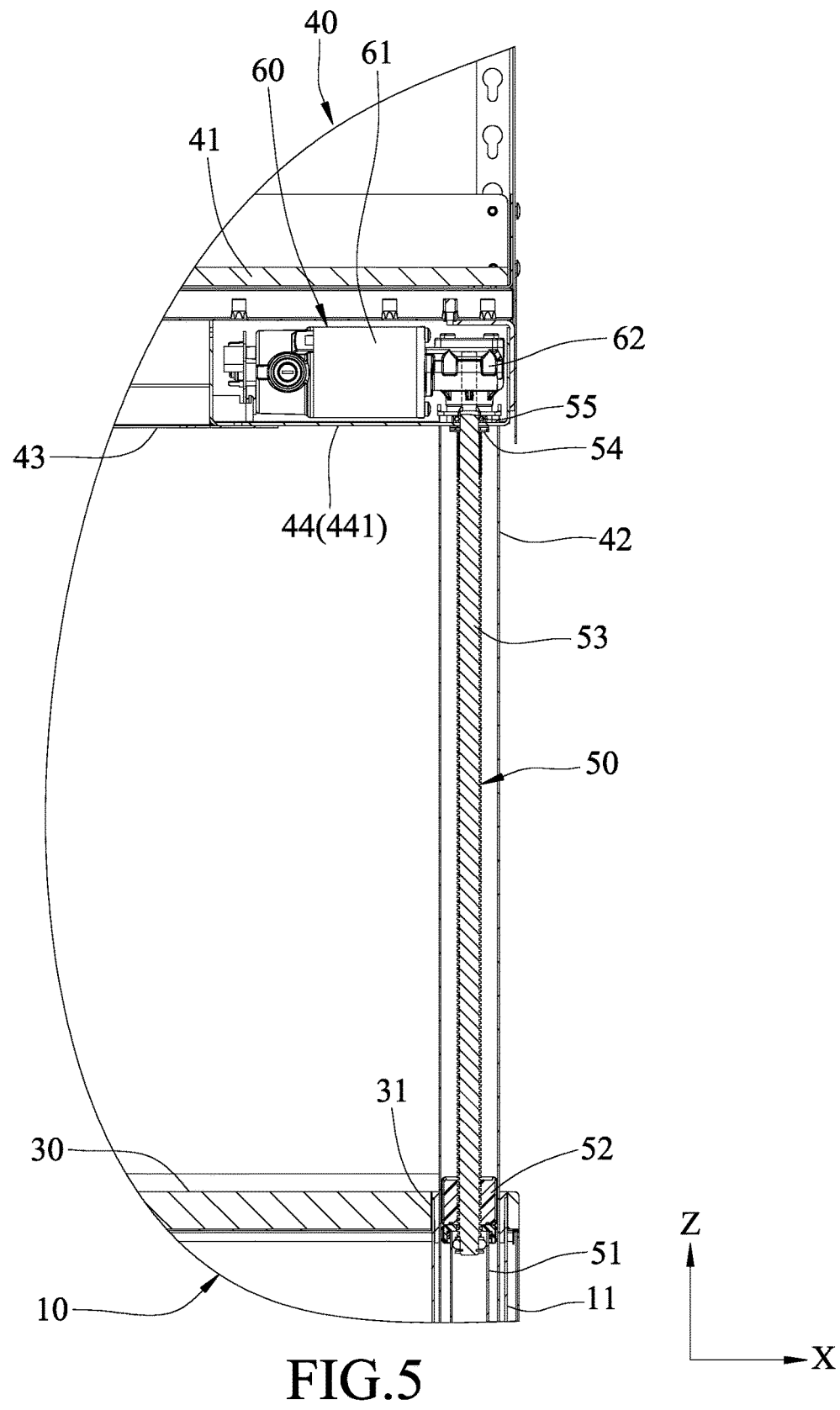
FIG. 5 is a fragmentary enlarged view of FIG. 4.

Referring to FIGS. 3 to 5, the cabinet body 10 includes two upright guide rails 11 spaced apart from each other in a horizontal direction (X) and extending in a vertical direction (Z).

The drawers 20 are movably disposed in the cabinet body 10.

The working platform 30 is disposed on a top end of the cabinet body 10 (i.e., the drawers 20 are disposed under the working platform 30), and is formed with two extension holes 31. The guide rails 11 extend respectively into the extension holes 31.

Figure 6:
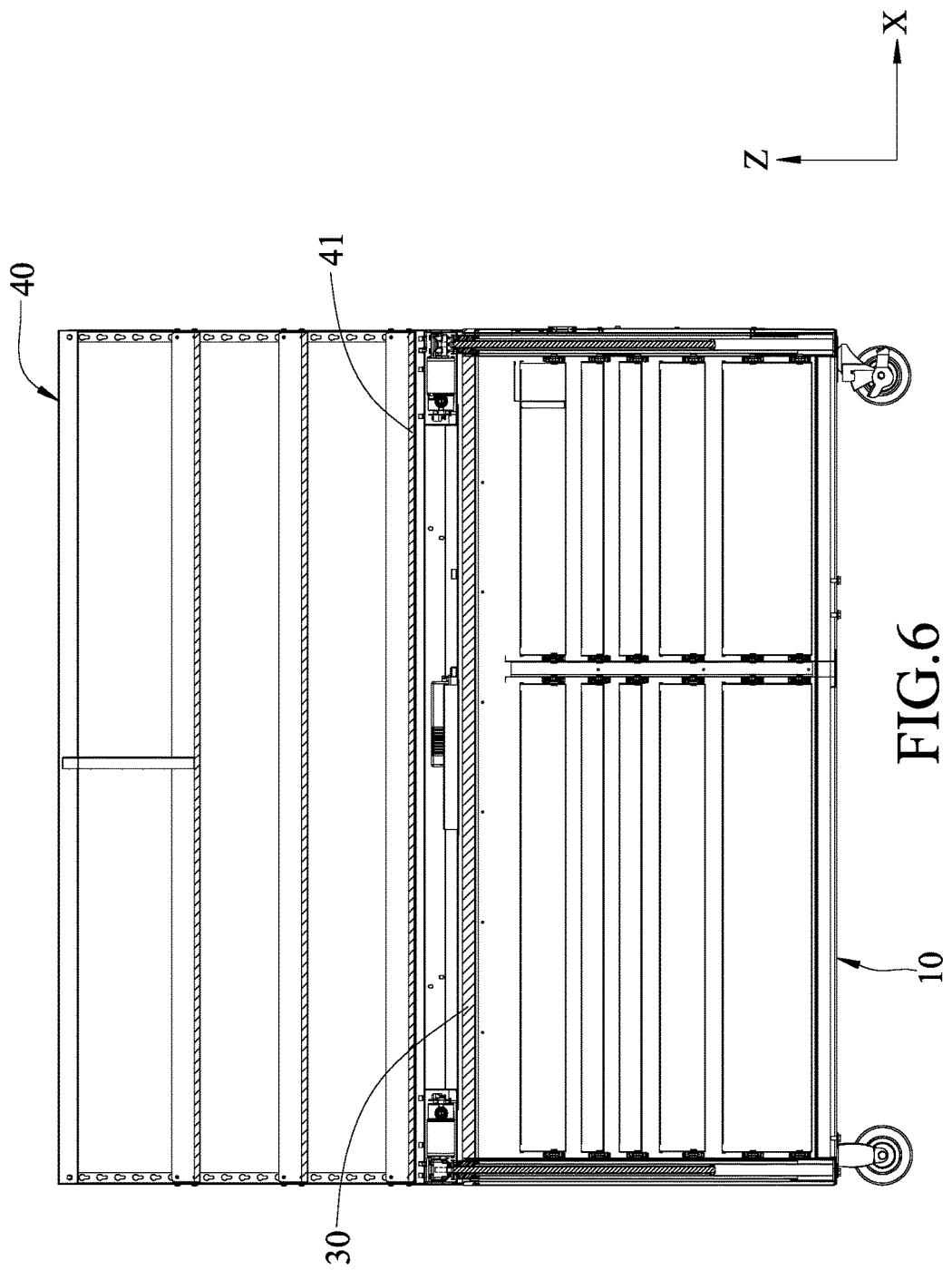
FIG. 6 is a view similar to FIG. 4, but illustrating the storage unit at the lowered position.

The storage unit 40 includes a support member 41, two hollow extension members 42, a cross beam 43, and two motor cases 44. The support member 41 is disposed above the working platform 30. The extension members 42 are respectively disposed on opposite ends of the support member 41. The cross beam 43 is disposed on a bottom surface of the support member 41, and has opposite longitudinal ends in the horizontal direction (X). Each of the motor cases 44 is disposed on the bottom surface of the support member 41, and is connected between a respective one of the longitudinal ends of the cross beam 43 and a respective one of the extension members 42. The extension members 42 are coupled respectively and telescopically to the guide rails 11, such that the storage unit 40 is movable relative to the cabinet body 10 between a lowered position (see FIGS. 2 and 6), where the support member 41 is proximate to the working platform 30, and a lifted position (see FIGS. 1 and 4), where the support member 41 is distal from the working platform 30. In this embodiment, the storage unit 40 is a rack structure adapted for storing objects (not shown), but may be configured as, for example, a cabinet equipped with drawers in other embodiments.

In this embodiment, the crossbeam 43 has a beam bottom wall 431 having opposite edges extending in the horizontal direction (X), and two connecting walls 432 respectively and upwardly extending from the opposite edges of the beam bottom wall 431, and cooperating with the beam bottom wall 431 to define a receiving space 433 that communicates with the motor cases 44. Each of the motor cases 44 has a case bottom wall 441.

Each of the lifting units 50 has a guide tube 51 mounted to the cabinet body 10 and extending into a respective one of the guide rails 11, a threaded member 52 non-rotatably connected to a top end of the guide tube 51, and a threaded rod 53 connected threadedly to the threaded member 52, extending through a respective one of the extension members 42, and mounted rotatably and co-movably to the storage unit 40.

In this embodiment, the threaded rod 53 of each of the lifting units 50 extends rotatably into a respective one of the motor cases 44. Each of the lifting units 50 (only one lifting unit 50 is shown in FIG. 5) further includes a thrust bearing 54 sleeved on the threaded rod 53 and connected to a bottom surface of the case bottom wall 441 of the respective one of the motor cases 44, and a ball bearing 55 sleeved on the threaded rod 53 and connected to a top surface of the case bottom wall 441 of the respective one of the motor cases 44.

The driving units 60 are disposed on the storage unit 40 and are received respectively in the motor cases 44. Each of the driving units 60 includes a motor 61 and a speed reduction mechanism 62 that is connected between the motor 61 and the threaded rod 53 of a respective one of the lifting units 50, and that is driven by the motor 61 to rotate the threaded rod 53 of the respective one of the lifting units 50. In this embodiment, the speed reduction mechanism 62 is a speed reduction gear box, but is not limited thereto in other embodiments. The threaded rod 53 of each of the lifting units 50 extends rotatably through the case bottom wall 441 into the respective one of the motor cases 44.

In this embodiment, the control unit 70 is received in the receiving space 433, is disposed between the driving units 60, and is electrically connected to the motors 61 of the driving units 60 for synchronizing operation of the motors 61.

To lift or lower the storage unit 40, a user needs to use the control unit 70 to start the motors 61 of the driving units 60, so as to synchronously drive rotation of the threaded rods 53 of the lifting units 50 relative to the corresponding threaded members 52. As a result, the storage unit 40 can be smoothly lifted or lowered along the guide rails 11 between the lowered position and the lifted position.

In view of the above description, the advantages of the tool cabinet according to the present disclosure can be summarized as follows. By virtue of the synchronous movements of the motors 61 driven by the control unit 70, the threaded rods 53 of the lifting units 50 can move synchronously. Furthermore, in comparison with the aforementioned conventional tool cabinet, access to the objects stored in the height-adjustable storage unit 40 would be more convenient.

Figure 7:
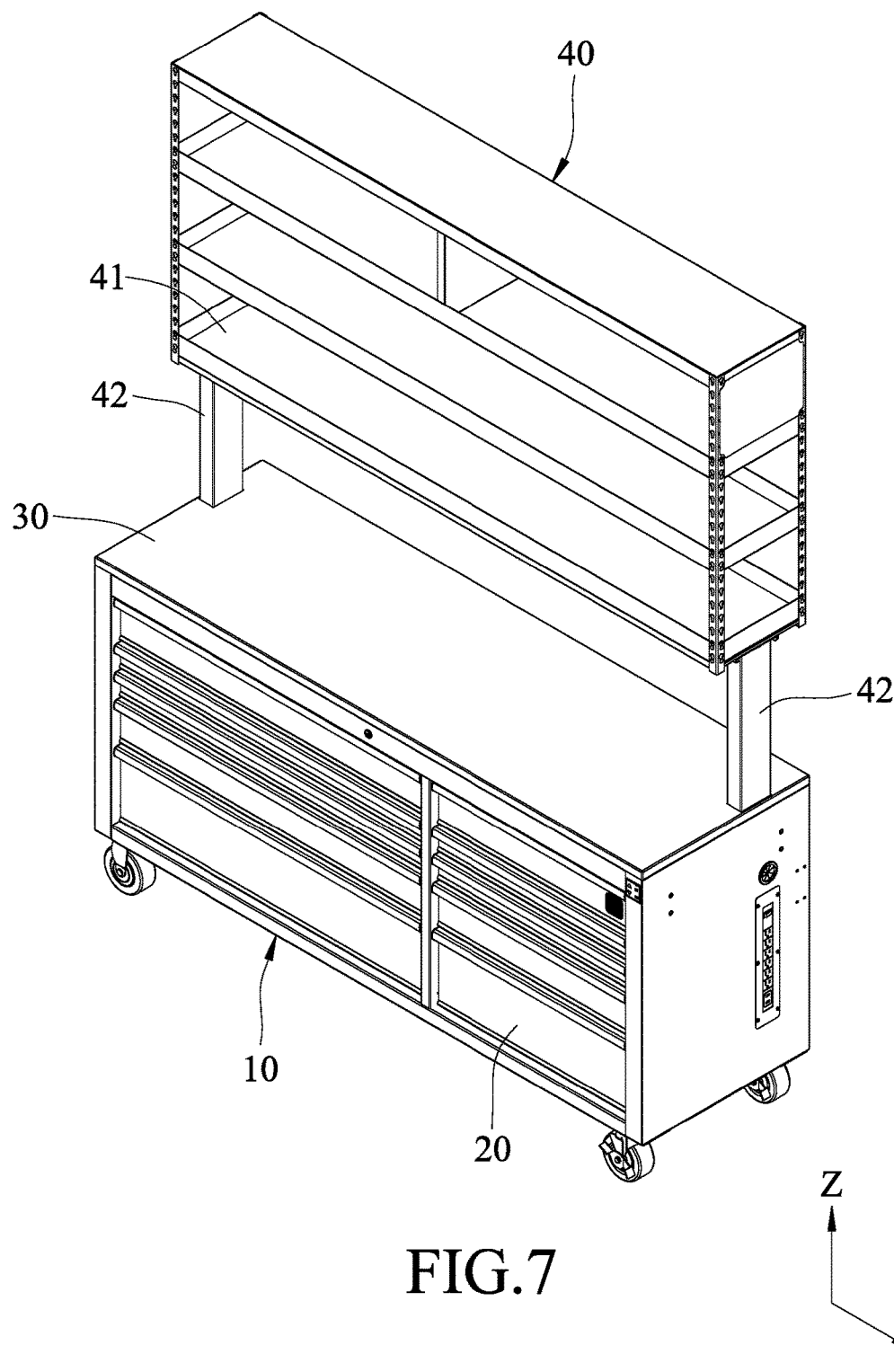
FIG. 7 is a perspective view of a second embodiment of the tool cabinet according to the disclosure, illustrating the storage unit at the lifted position.
Figure 8:
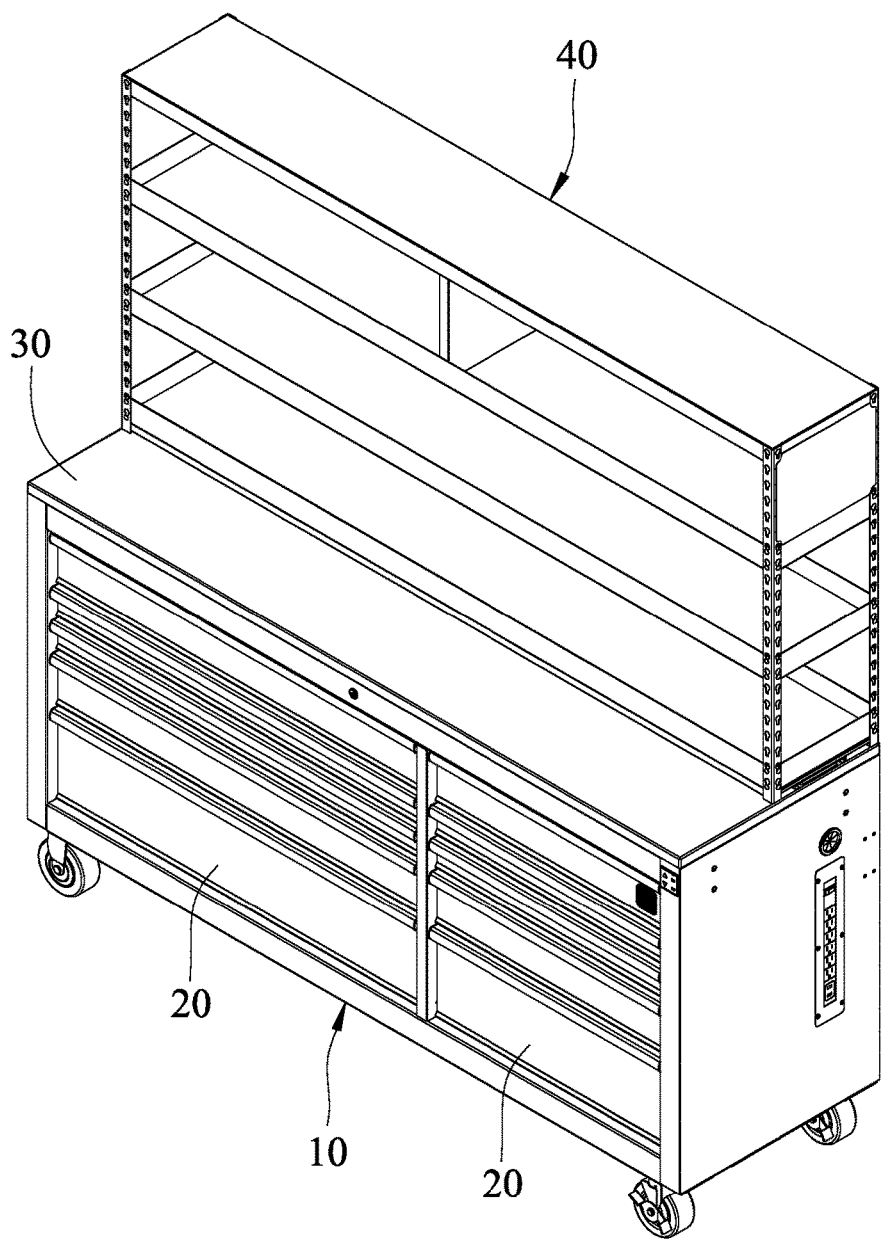
FIG. 8 is a view similar to FIG. 7, but illustrating the storage unit at the lowered position.
Figure 9:
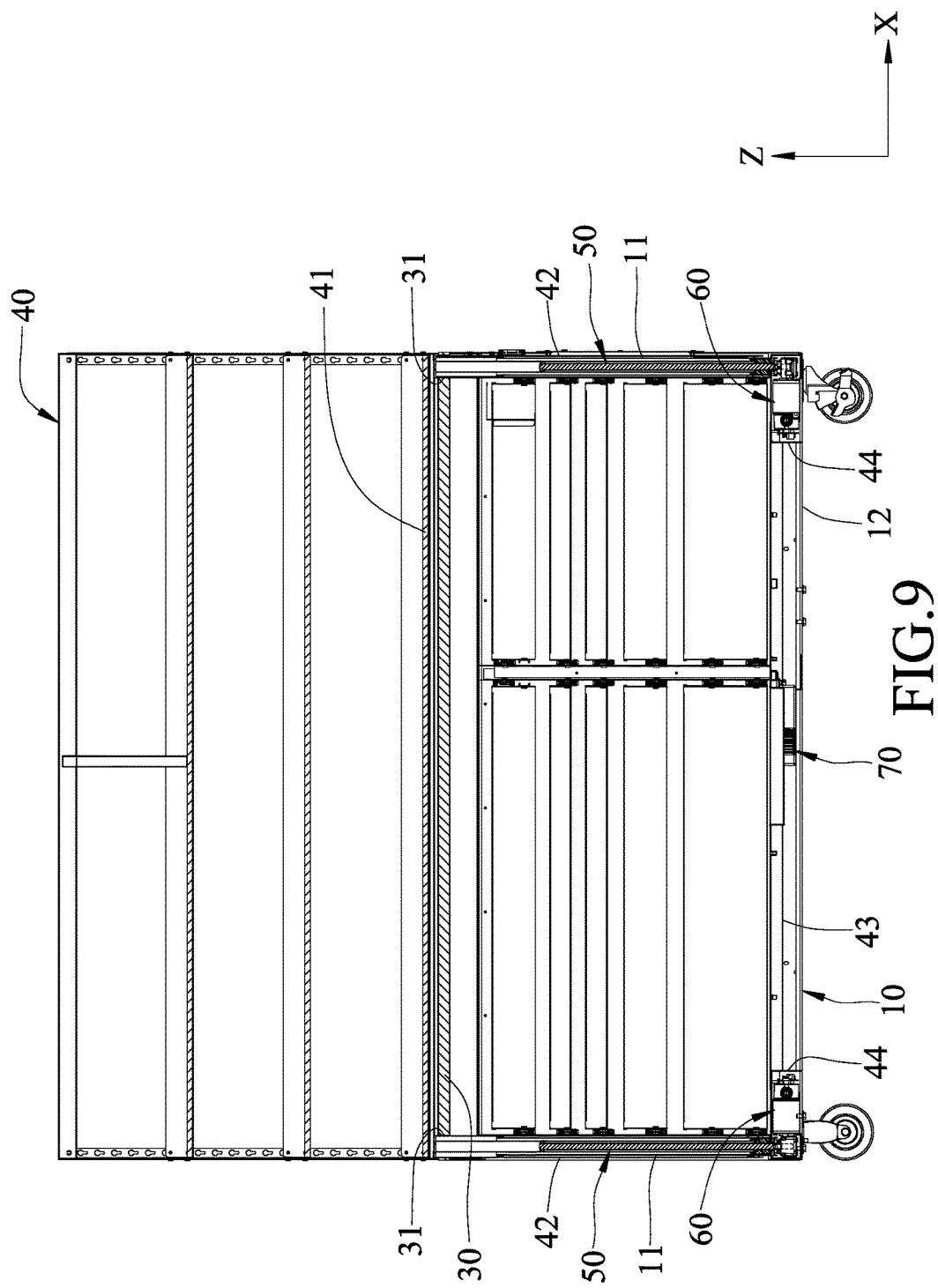
FIG. 9 is a sectional view of the second embodiment, illustrating the storage unit at the lowered position.

Referring to FIGS. 7 to 9, a second embodiment of the tool cabinet has a structure similar to that of the first embodiment.

Figure 10:
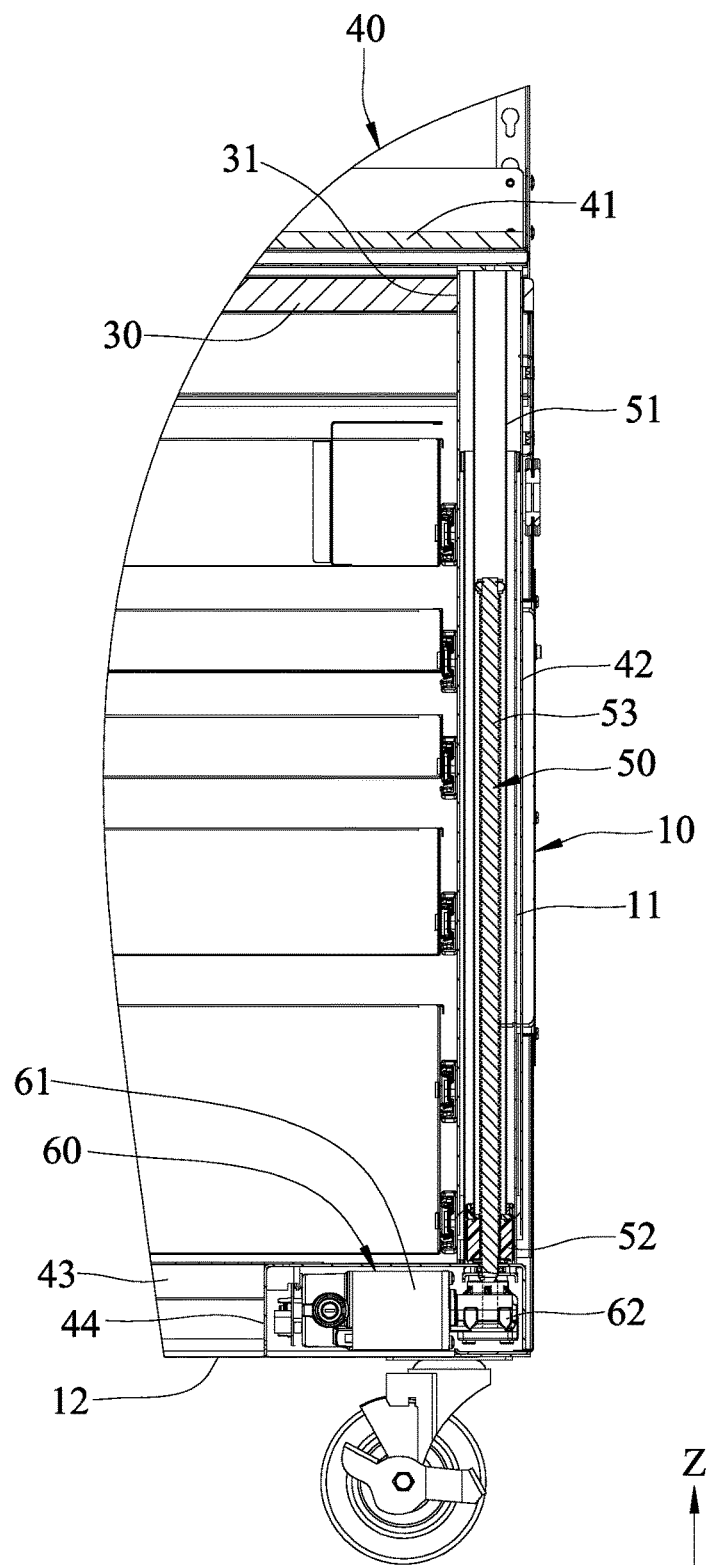
FIG. 10 is a fragmentary enlarged view of FIG. 9.
Figure 11:
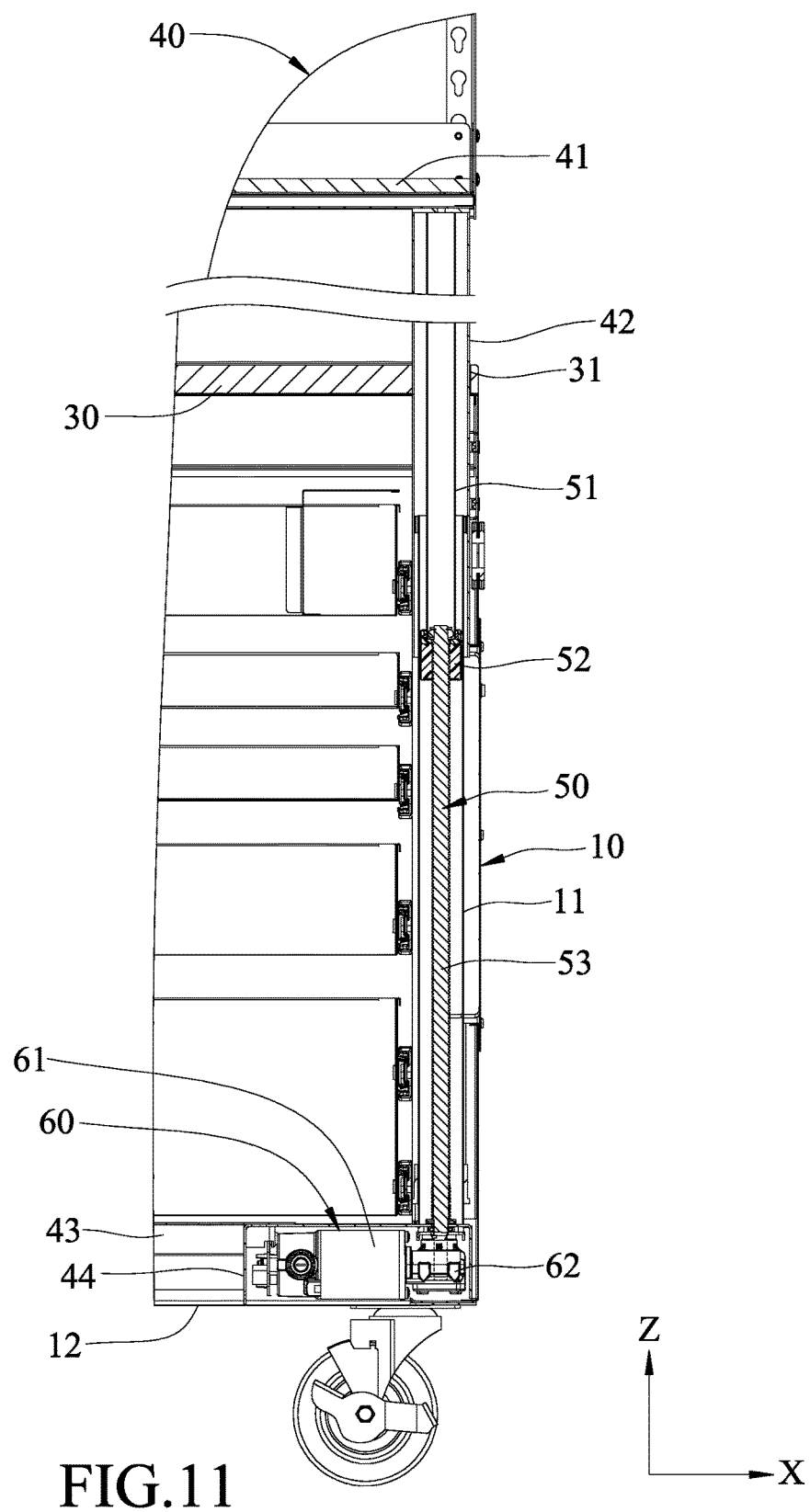
FIG. 11 is a view similar to FIG. 10, but illustrating the storage unit at the lifted position.

Referring further to FIGS. 9 to 11, the main difference between the second embodiment and the first embodiment resides in the following.

In this embodiment, the cabinet body 10 further has a bottom end wall 12. The cross beam 43 is disposed on the bottom end wall 12. The motor cases 44 are disposed on the bottom end wall 12.

Each of the extension members 42 of the storage unit 40 extends slidably through a respective one of the extension holes 31 of the working platform 30. The guide rails 11 of the cabinet 10 respectively extend into the extension members 42.

For each of the lifting units 50, the guide tube 51 is mounted to the support member 41 of the storage unit 40, the threaded member 52 is connected to a bottom end of the guide tube 51 and is disposed in a respective one of the guide rails 11, and the threaded rod 53 is mounted rotatably to the cabinet body 10 and extends downwardly into a respective one of the motor cases 44.

The driving units 60 are disposed on the bottom end wall 12 of the cabinet body 10 and respectively received in the motor cases 44.

For each of the lifting units 50, the rotation of the threaded rod 53 drives the threaded member 52 to move non-rotatably along the respective one of the guide rails 11, and such movement of the threaded member 52 results in the movement of the storage unit 40 between the lowered position (see FIGS. 8 and 10) and the lifted position (see FIGS. 7 and 11). The second embodiment has the same advantages as those of the first embodiment.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular future, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed:

1. A tool cabinet comprising:
    a cabinet body including two spaced-apart upright guide rails;
    a working platform disposed on a top end of said cabinet body;
    a storage unit including
        a support member that is disposed above said working platform, and
        two hollow extension members that are respectively disposed on opposite ends of said support member, and that are coupled respectively and telescopically to said guide rails, such that said storage unit is movable relative to said cabinet body between a lowered position, where said support member is proximate to said working platform, and a lifted position, where said support member is distal from said working platform;

two lifting units, each of which includes
    a guide tube that is mounted to one of said cabinet body and said storage unit,
    a threaded member that is non-rotatably connected to said guide tube, and
    a threaded rod that is mounted rotatably to the other one of said cabinet body and said storage unit, and that is connected threadedly to said threaded member, such that rotation of said threaded rods of said lifting units drives the movement of said storage unit between the lowered and lifted positions;

two driving units disposed on the other one of said cabinet body and said storage unit, each of said driving units including
    a motor, and
    a speed reduction mechanism that is connected between said motor and said threaded rod of a respective one of said lifting units, and that is driven by said motor to rotate said threaded rod of the respective one of said lifting units; and a control unit electrically connected to said motors of said driving units for driving said motors to operate synchronously;
    wherein said working platform is formed with two extension holes, said guide rails extending respectively into said extension holes;
    wherein for each of said lifting units, said guide tube is mounted to said cabinet body, said threaded member is connected to a top end of said guide tube, and said threaded rod is mounted rotatably and co-movably to said storage unit;
    wherein said storage unit further includes
        a hollow cross beam disposed on a bottom surface of said support member and having opposite longitudinal ends in a horizontal direction, and
        two motor cases disposed on said bottom surface of said support member, each of said motor cases being connected between a respective one of said longitudinal ends of said cross beam and a respective one of said extension members, and receiving a respective one of said driving units therein;
    wherein said threaded rod of each of said lifting units extends rotatably into a respective one of said motor cases;
    wherein each of said motor cases has a case bottom wall; and
    wherein each of said lifting units further includes
        a thrust bearing sleeved on said threaded rod and connected to a bottom surface of said case bottom wall of the respective one of said motor cases, and
        a ball bearing sleeved on said threaded rod and connected to a top surface of said case bottom wall of the respective one of said motor cases.

2. The tool cabinet as claimed in claim 1, wherein:
said cross beam has
    a beam bottom wall having opposite edges that extend in the horizontal direction, and
    two connecting walls respectively and upwardly extending from said opposite edges of said beam bottom wall, and cooperating with said beam bottom wall to define a receiving space that communicates with said motor cases; and
said control unit is received in said receiving space.

3. The tool cabinet as claimed in claim 1, further comprising a plurality of drawers movably disposed in said cabinet body and disposed under said working platform.

4. A tool cabinet comprising:
a cabinet body including two spaced-apart upright guide rails;
a working platform disposed on a top end of said cabinet body;
a storage unit including
    a support member that is disposed above said working platform, and
    two hollow extension members that are respectively disposed on opposite ends of said support member, and that are coupled respectively and telescopically to said guide rails, such that said storage unit is movable relative to said cabinet body between a lowered position, where said support member is proximate to said working platform, and a lifted position, where said support member is distal from said working platform;

two lifting units, each of which includes
    a guide tube that is mounted to one of said cabinet body and said storage unit,
    a threaded member that is non-rotatably connected to said guide tube, and
    a threaded rod that is mounted rotatably to the other one of said cabinet body and said storage unit, and that is connected threadedly to said threaded member, such that rotation of said threaded rods of said lifting units drives the movement of said storage unit between the lowered and lifted positions;

two driving units disposed on the other one of said cabinet body and said storage unit, each of said driving units including
    a motor, and
    a speed reduction mechanism that is connected between said motor and said threaded rod of a respective one of said lifting units, and that is driven by said motor to rotate said threaded rod of the respective one of said lifting units; and a control unit electrically connected to said motors of said driving units for driving said motors to operate synchronously;
    wherein said working platform is formed with two extension holes, each of said extension members extending slidably through a respective one of said extension holes;
    wherein said driving units are disposed on said cabinet body;
    wherein for each of said lifting units, said guide tube is mounted to said storage unit, said threaded member is connected to a bottom end of said guide tube, and said threaded rod is mounted rotatably to said cabinet body, such that the rotation of said threaded rod drives said threaded member to move non-rotatably along a respective one of said guide rails, and that the movement of said threaded member results in the movement of said storage unit between the lowered and lifted positions;
    wherein said cabinet body further includes
        a bottom end wall,
        a hollow cross beam disposed on said bottom end wall, and having opposite longitudinal ends in a horizontal direction, and two motor cases disposed on said bottom end wall, each of said motor cases being connected between a respective one of said opposite longitudinal ends of said cross beam and a respective one of said guide rails, and receiving a respective one of said driving units therein; and wherein said threaded rod of each of said lifting units extends rotatably into a respective one of said motor cases.

5. The tool cabinet as claimed in claim 4, further comprising a plurality of drawers movably disposed in said cabinet body and disposed under said working platform.

\* \* \* \* \*